Jan. 21, 1969 T. ARGE 3,423,073
CHEMICAL BLENDER
Filed Nov. 14, 1966 Sheet 3 of 3

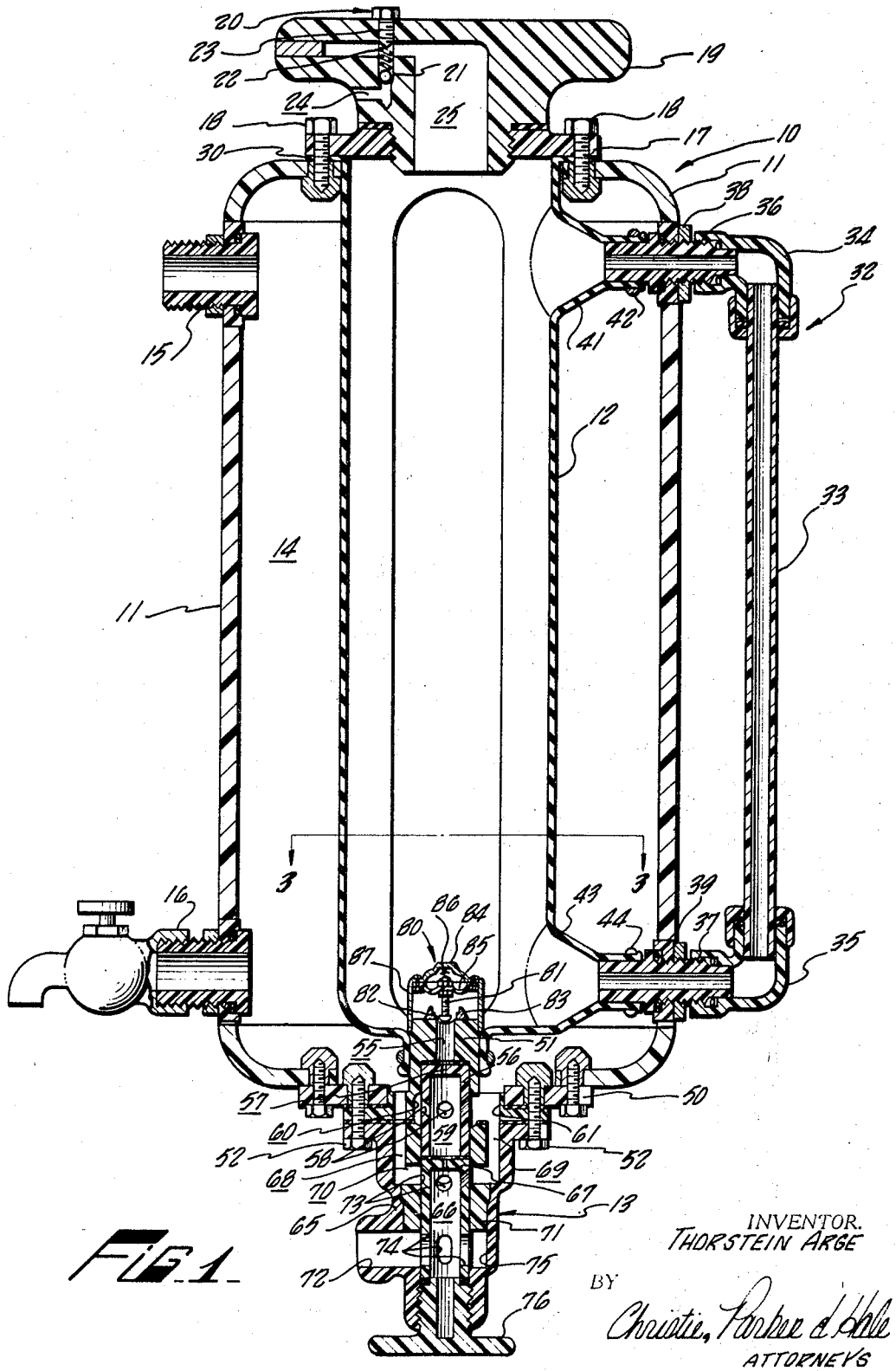

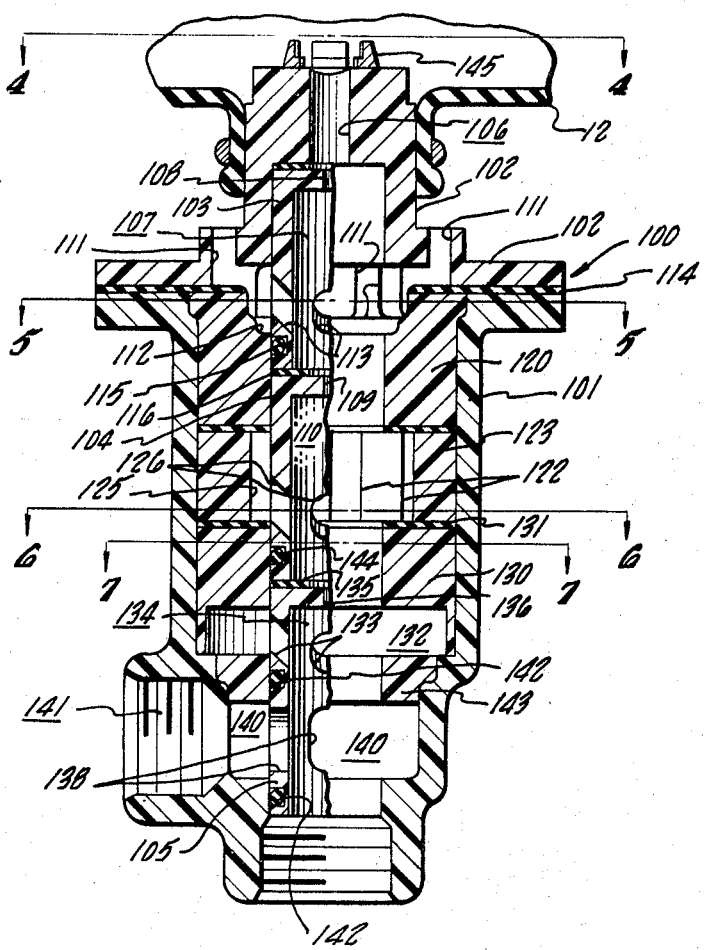
FIG_1_
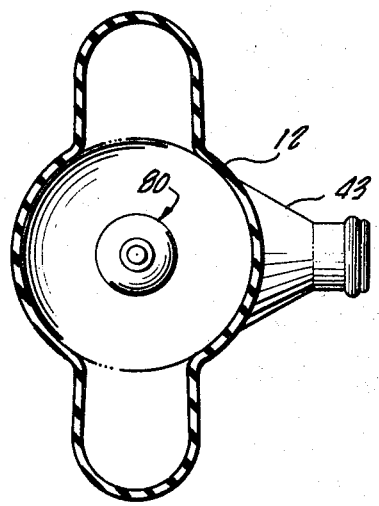
FIG_3_
INVENTOR.
THORSTEIN ARGE

INVENTOR.
THORSTEIN ARGE
BY
Christie, Parker & Hale
ATTORNEYS

United States Patent Office 3,423,073
Patented Jan. 21, 1969

3,423,073
CHEMICAL BLENDER
Thorstein Arge, La Canada, Calif., assignor to T. H. Arge Company, Inc., Pasadena, Calif., a corporation of California
Filed Nov. 14, 1966, Ser. No. 593,800
U.S. Cl. 259—4                        5 Claims
Int. Cl. B01f 5/00; B05b 9/04

ABSTRACT OF THE DISCLOSURE

A housing for a first fluid contains a relatively flat, collapsible bladder for a second fluid. A plurality of hollow, removable inserts are serially disposed in fluid communication with the interior of the bladder. The interior of the inserts define mixing chambers which are in communication with each other through metering orifices and, independently of these orifices, the interior of the housing outside the bladder. The communication of the mixing chambers with both fluids produces a predetermined blend of the fluids in each of the mixing chambers. A normally closed valve is disposed between the interior of the bladder and the mixing chambers to prevent drainage of the fluid contained in the bladder until a predetermined pressure exceeding atmospheric is exerted by the fluid outside the bladder on the fluid within the bladder.

---

This invention relates to chemical blenders and in particular to a chemical blender which meters the mixing of two fluids.

Chemical blenders mix or dilute one fluid with another. Often the mixing is accomplished by introducing a first fluid into a passage which is in pressure communication with a collapsible container containing a second fluid. The pressure exerted by the first fluid on the walls of the container forces the second fluid into the passage for mixing. Metering is accomplished through the use of the first fluid's pressure as the dispensing force for the second fluid.

This type of blender is adequate for many purposes. However, it is inflexible in that no provision is made for varying the concentration of the resultant mixture. In addition, the collapsible bag employed changes its volume in response to loss of the fluid which it contains. The collapsing of the bag has a tendency to produce crinkles resulting in localized stress points in the bag's walls which eventually cause the bag to fail in fatigue. Moreover, for compactness the bag is contained within a housing with a space between the outer walls of the bag and the interior walls of the housing for containing the first fluid. Because of this disposition of the bag there has heretofore been no ready means for observing the fluid content within the bag. In addition, it is highly desirable to prevent leakage of fluid in the bag when the blender is not in use. Leakage is wasteful of the contained chemical and often corrosive to the parts of the blender which it contacts. It is also desirable to provide an easy method of draining the space within the housing between its interior walls and the bag of the first fluid. Another problem which has been encountered with known chemical blenders occurs when the blender is not in use. Under this condition the pressure exerted by the first fluid outside the bag is lost. When the level of fluid in the bag is low, a vacuum will develop within the bag because of the loss of the force exerted by the fluid outside the bag.

The subject invention in its broadest form provides a simple, reliable and accurate chemical blender which is characterized by its adaptability to produce different chemical concentrations of two or more fluids. The preferred forms of the invention provide a bag or bladder which resists fatigue, means for avoiding loss of fluid contained in the bladder when the blender is not in use, means for observing the level of fluid in the bladder, as well as other advantages which will subsequently become apparent.

The invention includes a housing which has an interior for receiving a first fluid under pressure. A second fluid is contained in fluid communication with two or more mixing chambers in a blender assembly. Each mixing chamber is serially connected with its complementary mixing chambers and the second fluid containing means. The first fluid is in communication with each of the mixing chambers. In addition, metering means are provided, such as metering orifices, between adjacent mixing chambers and the mixing chambers and the second fluid containing means. The metering means are responsive to draw fluid from a preceding serially connected mixing chamber or second fluid container into a succeeding chamber in response to first fluid flow. Means are also provided for the withdrawing of the mixed or blended first and second fluids from the blender.

Preferably, the second fluid is contained in a bladder which is mounted within the housing in pressure communication with the housing's interior. The bladder has a flat cross section to avoid crinkling. In one form, the bladder has a generally tubular longitudinal midsection bounded by two diametrically opposed sections along its periphery. The circumferential dimension of the two outward sections is smaller than the circumference of the tubular midsection. Each of the two outer sections, together with the midsection, provide a space for containing the second fluid.

In addition, a preferred form of the present invention utilizes the interior of hollow inserts as its mixing chambers. The inserts are tandemly aligned in a bore in the blender assembly. Each insert has a metering orifice which communicates its mixing chamber with the other mixing chambers for the passage of the second fluid from the container to the last mixing chamber. To avoid loss of fluid from the container, a valve is disposed between the mixing chamber closest to the fluid container and the fluid container itself. The valve is normally closed but opens in response to a pressure exerted by the first fluid. A second valve is disposed at the bottom of the housing to drain the housing of contained first fluid when the blender is not in use. In addition, a sight gauge is connected in fluid communication with the interior of the bladder to indicate the amount of fluid it contains. To avoid the creation of a vacuum in the bladder when its fluid level is low and the pressure exerted by the first fluid is either absent or below atmospheric, another valve is provided which opens upon the sensing of the vacuum to admit atmospheric air into the bladder.

The plurality of mixing chambers provided in the instant invention allows for the staged blending of two fluids. The metering means between adjacent chambers can be readily varied to yield any chemical concentration of two or more fluids. The use of inserts which define the mixing chambers provides a convenient means for altering chemical concentration because the number of inserts can be changed. Alternatively, the diameter of the metering orifices can be changed to effect a different blend of fluids. The sight gauge provides a convenient means for observing the level of fluid in the bladder. The valve disposed between the interior of the bladder and the mixing chambers prevents loss of fluid contained in the bladder into the mixing chambers when the blender is not in use. Moreover, the flat cross section of the bladder avoids crinkle-induced leaks. The air admission or relief valve to prevent a vacuum in the bladder and the housing drain valve are also convenient features.

These and other features, aspects and advantages of the present invention will become more apparent from the following description, appended claims and drawings, in which:

FIGURE 1 is an elevational view in half section of a preferred blender of the instant invention;

FIGURE 2 is an elevational half section, partly fragmented, of a preferred blender assembly;

FIGURE 3 is a sectional view of a preferred bladder taken along line 3—3 of FIGURE 1;

Figure 4:
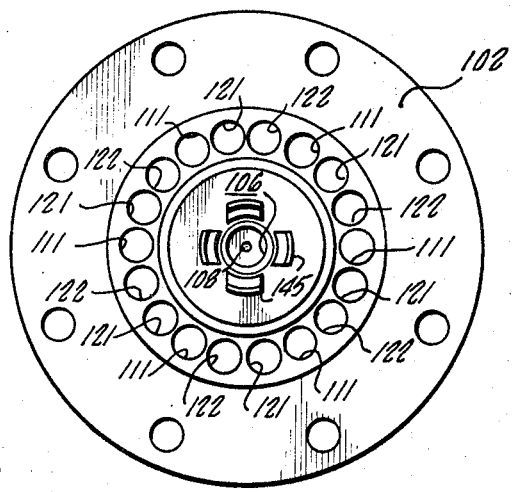
FIGURE 4 is a view of the embodiment shown in FIGURE 2 taken along line 4—4.

FIGURE 1 shows a preferred chemical blender 10. In general the blender comprises a housing 11, in which is disposed a collapsible bladder 12, and a blender assembly 13 mounted at the bottom of the housing.

Housing 11 has an interior 14 for containing a fluid such as water. Fitting 15 is mounted in the side of the housing and provides fluid communication between a source of fluid and interior 14. Typically, the fitting is attached to a pressurized water supply. Valve 16 is mounted on the lower portion of housing 11 to drain the housing of water when the blender is not in use. Mounting plate 17 is connected to housing 11 by fasteners 18. Filler plug 19 is engaged in threads in mounting plate 17. The filler plug 19 is removable to gain access to the interior of bladder 12 to fill the bladder with desired fluid. Relief valve 20 is disposed in plug 19 to admit atmospheric air to within the interior of bladder 12 when the pressure in the bladder falls below atmospheric. The valve consists of a ball 21 which is retained in a seat formed by a counterbore and biased by spring 22. The ball and spring are retained in place by bolt 23 in duct 24 which is open to atmosphere. When atmospheric pressure exceeds the pressure within bladder 12, ball 21 will move upwardly against spring 22 to admit air into the interior of the bladder through passage 25 in plug 19.

Bladder 12 is open at its top and has an annular flange 30 which surrounds the opening. The bladder is mounted in housing 11 at flange 30 and is retained securely in place by the bearing of mounting plate 17 against the upper surface of the flange. Sight gauge 32 is mounted vertically on the outside of housing 11. The sight gauge comprises a glass or plastic transparent tube 33 which is held in place by elbows 34 and 35. Elbow 34 is connected to housing 11 by nipple 36 while elbow 35 is connected to the housing through nipple 37. Nipple 36 is retained in place in the wall of housing 11 by nut 38. Similarly, nipple 37 is retained in the wall of housing 11 by nut 39. Neck 41 is integral with bladder 12 and is connected to nipple 36. Spring clip 42 clamps neck 41 to nipple 36. Bladder 12 also has a lower integral neck 43 which is connected to nipple 37 and clamped in place by spring clip 44. The fluid level within bladder 12 is indicated in transparent tube 33 by virtue of the tube's fluid and pressure communication with the interior of the bladder through the bores of nipples 36 and 37.

The blender assembly 13 which is shown in FIGURE 1 is a two-stage blender. Blender assembly 13 is mounted to the bottom of housing 11 through mounting flange 50. Fluid distributing member 51 is connected through fasteners 52 to mounting flange 50. Member 51 has an axial duct 55 which opens into the interior of bladder 12. In addition, a plurality of fluid distribution passages are provided through member 51 to distribute fluid contained in interior 14 of housing 11 for mixture with fluid contained in bladder 12. For this purpose, fluid mixing insert 56 is disposed and retained in member 51. Insert 56 includes a metering orifice 57 which opens into duct 55. Ports 58 communicate the interior of insert 56 with interior 14 of housing 11. The interior of insert 56 forms a mixing chamber which is denoted by reference numeral 59. Communication between mixing chamber 59 and interior 14 is provided through annular duct 60 which opens into a plurality of passages, one of which is shown by reference numeral 61. Passage 61 opens into interior 14.

Body 65 is connected to mounting flange 50 through member 51 by fasteners 52. Body 65 together with member 51 define a plurality of passages for fluid flow into mixing chamber 66 of insert 67. In FIGURE 1, two of these passages are shown by reference numerals 68 and 69. Passages 68 and 69, together with other passages not shown, open into annulus 70. Annulus 70 is bounded by plug 71 which seals the annulus from outlet 72. A plurality of ports 73 are disposed in the walls of insert 67 to communicate mixing chamber 66 with annulus 70. These ports, as are ports 58 of insert 56, are disposed at an angle to facilitate the discharge of fluid into the mixing chambers. Insert 67 further includes a plurality of radially disposed outlet ports 74 which communicate mixing chamber 66 with annulus 75 and in turn with outlet 72. The blended mixture is discharged from outlet 72 into a pressure environment which is less than that existing in interior 14. Plug 76 is engaged in threads in body 65 to retain the inserts in place and to provide a convenient means of changing the inserts.

Between duct 55 and the interior of bladder 12 is disposed a check valve 80. Valve 80 closes duct 55 from fluid flow from bladder 12 except when the pressure in interior 14 exceeds atmospheric pressure. For this purpose, valve member 81 normally rests on valve seat 82 formed at the upper terminus of duct 55. Valve member 81 passes between guides 83 which are mounted on top of member 51. Cap 84 together with elastic diaphragm 85 enclose a space which is normally at atmospheric pressure. Compression spring 86 is within this space and urges the valve member 81 against seat 82. When the pressure within interior 14, which is felt by fluid within bladder 12, exceeds atmospheric pressure it will urge against diaphragm 85 and spring 86 to lift valve member 81 off seat 82 to allow the admission of fluid into duct 55. Valve 80 is mounted to member 51 through mounting bracket 87.

Bladder 12 is shown in cross section in FIGURE 3. In general, the bladder has a cylindrical midsection connected to two lateral sections to form an interior which is greater in one lateral dimension than the other. It has been found that cylindrical bladders have a tendency to crinkle upon collapsing to generate fatigue stress and leaks. However, by having a more or less flat bladder, as shown in FIGURE 3, the crinkling problem is overcome.

Figure 5:
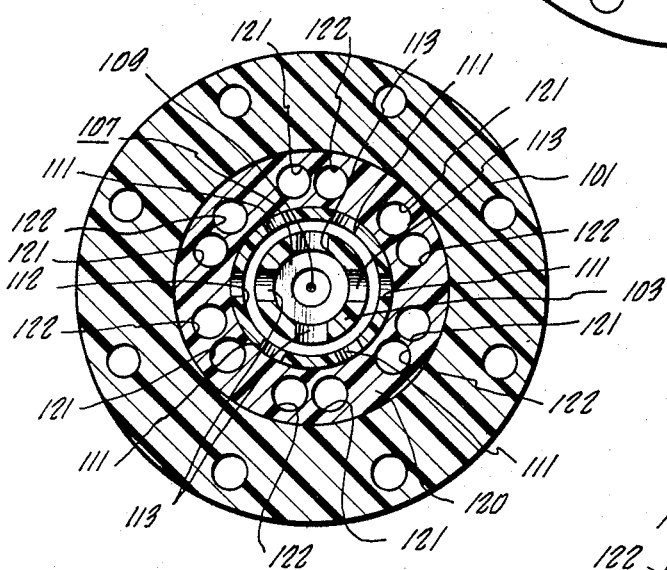
FIGURE 5 is a view taken along line 5—5 of FIGURE 2.
Figure 6:
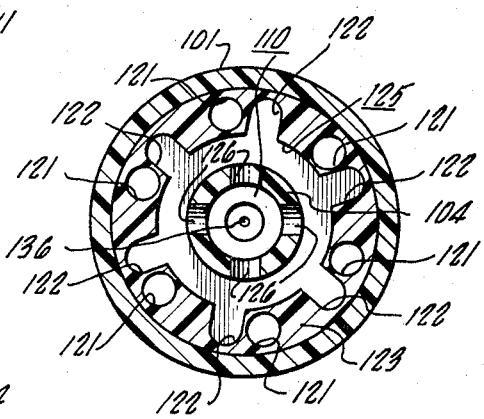
FIGURE 6 is a view taken along line 6—6 of FIGURE 2.
Figure 7:
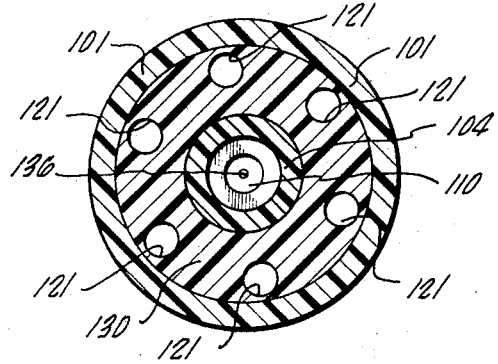
FIGURE 7 is a view taken along line 7—7 of FIGURE 2.

FIGURES 2 and 4 through 7 show an alternate embodiment for the blender assembly. In this embodiment there are three mixing chambers. Blender assembly 100 has a body 101 which is capped by manifold piece 102. Within the blender are three inserts: 103, 104 and 105. These inserts are tandemly aligned in an axial bore extending through body 101 and into manifold piece 102. The axial bore opens into duct 106. The interior of insert 103 defines a mixing chamber 107. Metering orifice 108 provides communication between duct 106 and mixing chamber 107. Metering orifice 109 provides communication between mixing chamber 107 and mixing chamber 110 of insert 104. As is seen in FIGURE 4, manifold piece 102 has a plurality of passages for the distribution of fluid from the housing to the mixing chambers. Passages 111 in manifold piece 102 open into annulus 112 for distribution of fluid through ports 113 into mixing chamber 107. Annular gasket 114 is disposed between the flange of body 101 and manifold piece 102 to avoid leaks. Insert 103 is held in axial bore by O-ring 115. Annular gasket 116 is interposed between insert 103 and insert 104. Cylindrical fluid distribution member 120 is held in body 101 and bounds passages 111 and annulus 112. Ducts 121 and 122 pass through distribution member 120, as seen in FIGURE 5, and continue into distribution member 123. Ducts 122 open into annular opening 125 as is seen in FIGURE 6. Insert 104 has a plurality of circumferential ports 126 in its wall in communication with annulus 125 and mixing chamber 110. Fluid distribution piece 130 is mounted in body 101 below fluid distribution member 123. As before, ducts 121 continue into fluid distribution member 130. Fluid distribution members 123 and 130 are separated by an annular gasket 131. Ducts 121 shown in FIGURE 7 extend through fluid distribution member 130 into annulus 132 which is shown in FIGURE 2. Insert 105 has a plurality of circumferential ports 133 which open into annulus 132 to communicate its mixing chamber 134 with ducts 121. Insert 105 is tandemly aligned with insert 104 with gasket 135 interposed between them. Metering orifice 136 provides the fluid communication between mixing chamber 110 and mixing chamber 134. Insert 105 has a plurality of circumferentially disposed outlet ports 138. These ports open into annulus 140 which is open to outlet 141. Insert 105 has O-rings 142 disposed in its surface to secure it within the bore defined by fluid distribution piece 130 and closing piece 143. Similarly, insert 104 has an O-ring 144 in its outer surface to secure it in place in the bore defined by fluid distribution pieces 120 and 130.

As in the embodiment described in FIGURE 1, a check valve can be placed between the interior of bladder 12 and duct 106 within guides 145 to prevent the passage of fluid between the bladder and the mixing chambers when the blender is not in use. Inserts 103, 104 and 105 are held in place by O-rings about their outer surface. However, as in the embodiment described in FIGURE 1 a closing plug similar to that shown by reference numeral 76 in that figure is preferably employed to insure the proper longitudinal positioning of the inserts. The plug can be removed for the removal of the inserts.

In the embodiment shown in FIGURE 2, chemical blending or fluid mixing is accomplished in three stages. Each mixing chamber of each of the inserts is in fluid communication with other mixing chambers as well as duct 106. Duct 106 opens to the interior of bladder 12. In addition, fluid is introduced into the mixing chambers through lateral ports in the inserts. The concentration of chemical mixed in any one of the inserts is determined by its metering orifice. Merely by substituting an insert with a different size metering orifice, a different concentration of chemicals can be produced.

The operation of the chemical blender will now be described. This description will be with reference to a first fluid of water introduced through fitting 15 under pressure into interior 14 of housing 11 as shown in FIGURE 1. Chemical contained within the bladder 12 will be referred to as the second fluid. The second fluid is introduced into bladder 12 by opening filler plug 19 and filling the bladder. Water in interior 14 will urge against the lateral walls of bladder 12 and is the motivating force for blending water and the second fluid. The pressure within bladder 12 is the same as that in interior 14. If the water pressure is above atmospheric, valve member 81 will raise upwardly to clear seat 82 and allow the admission of second fluid into duct 55 which corresponds to duct 106 in FIGURE 2.

For purposes of clarity the remaining portion of the operation will be described with reference to FIGURES 2 and 4 through 7. Water will pass into passages 111, into annulus 112, through ports 113 and into mixing chamber 107. Metering orifice 108 will admit fluid from duct 106 into mixing chamber 107. A first stage of chemical mixing is then accomplished. This mixed or blended chemical is drawn through metering orifice 109 into mixing chamber 110. Water will pass through passages 122 into annulus 125 and through ports 126 for mixing with the first stage blend in mixing chamber 110. Thus, a second stage of blending has been accomplished. The mixture in mixing chamber 110 will be admitted to mixing chamber 134 through metering orifice 136 where it is mixed with water introduced through passages or ducts 121 into annulus 132 and through ports 133. The mixture of water and second fluid in mixing chamber 134 will then be exited from the blending assembly 100 through outlet 141. If the metering orifice for each of the inserts is calibrated to admit one part second fluid to 20 parts first fluid, a final mixing ratio of one part second fluid in 8,000 parts of first fluid will be accomplished. Alternately, if the metering orifice for each of the three inserts is calibrated to admit one part second fluid to 200 parts first fluid, a final mixing ratio of one part second fluid in 8,000,000 parts first fluid is accomplished. It is clear that merely through changing the metering orifices that different mixing ratios are possible.

The instant invention has been described with reference to certain preferred embodiments. The scope and spirit of the appended claims should not, however, necessarily be limited to this description.

What is claimed is:
1. A chemical blender comprising:
 (a) a housing having an interior;
 (b) means for supplying a first fluid under pressure to the interior of the housing;
 (c) a collapsible bladder for containing a second fluid disposed within the housing in pressure communication with the housing's interior and responsive to the pressure of the first fluid to pressurize the second fluid, the bladder having a relatively flat cross section to avoid fatigue failure from repetitive collapsing;
 (d) a blender assembly having:
  (i) a bore,
  (ii) a plurality of hollow, removable inserts tandemly aligned within the bore, the interior of each insert defining a mixing chamber,
  (iii) a metering orifice between adjacent mixing chambers and between the bladder and the mixing chamber closest to the bladder, the metering orifices providing serial fluid communication between the mixing chambers and the bladder,
  (iv) means for providing fluid communication between each of the mixing chambers and the interior of the housing outside the bladder to produce in cooperation with the metering orifices a predetermined blend of the first and second fluids in each mixing chamber and in successive downstream chambers successively more dilution of the second fluid in the first fluid, and
  (v) means for discharging the blended first and second fluids from the mixing chamber farthest removed from the bladder; and
 (e) a normally closed valve between the interior of the bladder and the mixing chambers, the valve being operable to open and communicate the mixing chambers with the interior of the bladder upon the exertion of a predetermined pressure above atmospheric on the bladder by the first fluid.

2. The chemical blender claimed in claim 1 including a sight gauge in fluid communication with the interior of the bladder and operable to visually indicate the amount of the second fluid within the bladder.

3. The chemical blender claimed in claim 1 including valve means for emptying the first fluid from the housing's interior.

4. The chemical blender claimed in claim 1 including pressure responsive valve means for admitting air into the bladder's interior when the pressure in such interior falls below atmospheric pressure.

5. The chemical blender claimed in claim 4 wherein the metering orifices are formed in the hollow inserts.

References Cited

UNITED STATES PATENTS

| 1,492,463 | 4/1924 | Isenhour | 259—4 XR |
| 1,647,473 | 11/1927 | Rushmore | |
| 2,890,868 | 6/1959 | Potchen | 259—4 |
| 3,281,123 | 10/1966 | Dailey | 259—4 |

FOREIGN PATENTS

| 217,829 | 3/1957 | Australia. |
| 754,269 | 8/1933 | France. |

WALTER A. SCHEEL, *Primary Examiner.*

J. M. BELL, *Assistant Examiner.*

U.S. Cl. X.R.

222—94; 239—323